US011548818B2

(12) United States Patent
Liu et al.

(10) Patent No.: US 11,548,818 B2
(45) Date of Patent: Jan. 10, 2023

(54) METHOD FOR PREPARING LIGHT MAGNESIUM OXIDE AND CALCIUM OXIDE AND APPLICATION THEREOF FOR PREPARING CALCIUM-MAGNESIUM COMPOSITE EXPANDING AGENT

(71) Applicants: SOBUTE NEW MATERIALS CO., LTD., Nanjing (CN); ZHENJIANG SOBUTE NEW MATERIAL CO., LTD., Zhenjiang (CN)

(72) Inventors: Jiaping Liu, Nanjing (CN); Shouzhi Zhang, Nanjing (CN); Yong Zhang, Nanjing (CN); Yujiang Wang, Nanjing (CN); Rui Wang, Nanjing (CN)

(73) Assignees: SOBUTE NEW MATERIALS CO., LTD, Nanjing (CN); ZHENJIANG SOBOTE NEW MATERIALS CO., LTD., Zhenjiang (CN)

( * ) Notice: Subject to any disclaimer, the term of this patent is extended or adjusted under 35 U.S.C. 154(b) by 95 days.

(21) Appl. No.: 17/044,298

(22) PCT Filed: Aug. 7, 2019

(86) PCT No.: PCT/CN2019/099571
§ 371 (c)(1),
(2) Date: Nov. 5, 2020

(87) PCT Pub. No.: WO2020/220499
PCT Pub. Date: Nov. 5, 2020

(65) Prior Publication Data
US 2021/0163352 A1 Jun. 3, 2021

(30) Foreign Application Priority Data
Apr. 30, 2019 (CN) ............................ 201910362948

(51) Int. Cl.
*C04B 2/10* (2006.01)
*C04B 18/02* (2006.01)
*C04B 111/40* (2006.01)

(52) U.S. Cl.
CPC ............ *C04B 2/102* (2013.01); *C04B 18/027* (2013.01); *C04B 2111/40* (2013.01)

(58) Field of Classification Search
CPC ......... C04B 2/102; C04B 2/106; C04B 14/28; C04B 14/304; C04B 18/027; C04B 38/02; C04B 40/0042; C04B 2111/40; Y02P 40/40
See application file for complete search history.

(56) References Cited

FOREIGN PATENT DOCUMENTS

| CN | 103159443 A | 6/2013 |
|---|---|---|
| CN | 102459116 A | 8/2013 |
| CN | 104671688 A | 6/2015 |
| CN | 110066123 A | 7/2019 |
| GB | 319690 A | 8/1930 |

OTHER PUBLICATIONS

Machine Translation of Chinese Patent Specification No. CN 103159443 A (Year: 2013).*
G. H. Smith, H. H. Pomeroy, C. G. McGee and K. J. Mysels "Preparation of Aluminum Di-Soaps"J. Am. Chem. Soc., 1948, 70, 1053-1054.

* cited by examiner

*Primary Examiner* — Anthony J Green
(74) *Attorney, Agent, or Firm* — Treasure IP Group, LLC (57) ABSTRACT

Disclosed are a method for separately preparing light magnesium oxide and calcium oxide by using dolomite and an application thereof in preparation of a calcium-magnesium composite expanding agent. In the method for preparing light magnesium oxide and calcium oxide, based on the difference in decomposition temperature between magnesium carbonate and calcium carbonate during the calcination and decomposition of dolomite and the difference in the weight of the materials after decomposition, the effective separation of magnesium oxide and calcium oxide is realized by a one-step method, thus separately preparing light magnesium oxide and light calcium oxide. The calcium-magnesium composite expanding agent is prepared by using the foregoing light magnesium oxide and calcium oxide. On the one hand, the present invention solves the problem of the limited origin of the light magnesium oxide raw material of the magnesium expanding component in the calcium-magnesium composite expanding agent.

9 Claims, 2 Drawing Sheets

METHOD FOR PREPARING LIGHT MAGNESIUM OXIDE AND CALCIUM OXIDE AND APPLICATION THEREOF FOR PREPARING CALCIUM-MAGNESIUM COMPOSITE EXPANDING AGENT

CROSS REFERENCE TO RELATED APPLICATION

This application claims priority to a PCT application PCT/CN2019/099571 filed on Apr. 30, 2019, which in turn claims priority to a Chinese Application No. 201910362948.4, filed on Apr. 30, 2019. The PCT and Chinese Applications are incorporated herein by reference in their entireties.

BACKGROUND OF THE INVENTION

Technical Field

The present invention relates to the calcination and decomposition technology of dolomite, in particular to a method for separately preparing light magnesium oxide and calcium oxide by using dolomite and the application thereof for preparing a calcium-magnesium composite expanding agent.

Description of Related Art

Dolomite ($CaMg(CO_3)_2$) is a double salt of magnesium carbonate and calcium carbonate and mainly comprises magnesium oxide, calcium oxide, $SiO_2$, and $Fe_2O_3$, and the average contents of magnesium oxide, calcium oxide, $SiO_2$, and Fe2O3 are 21.29%, 30.42%, 0.78%, and 0.13%, respectively. China's dolomite resources are widely distributed, with reserves of 8.22 billion tons, and the production areas of dolomite are all over the country. There are large dolomite deposits in Liaoning, Inner Mongolia, Shanxi, Henan, Hebei, Jiangsu, Anhui, Hunan, Hubei, Sichuan, Chongqing, Fujian, Zhejiang and other places.

At present, dolomite is mainly used to produce light magnesium oxide and calcium salts.

Light magnesium oxide is a product in the field of inorganic chemicals and mainly used in the manufacture of metallurgy, smelting, high-grade magnesium bricks, refractory materials and moisturizing materials. It is also widely used in rubber, rubber sheets, rubber products, pharmaceutical industry, food industry, plastic sheet accelerators, plasticizers for glass fiber reinforced plastics and surface coating paints for silicon steel sheets, paper production, steel ball polishing, leather treatment, insulation material, greases, dyes, ceramics, desiccants, resins, flame retardants, etc.

As a by-product of the production of light magnesium oxide from dolomite, calcium salts mainly include calcium carbonate, calcium sulfate, and calcium chloride depending on the production process. Calcium carbonate can be used in the fields of cement production, flue gas desulfurization, construction, etc; calcium sulfate can be used in the field of building gypsum; calcium chloride can be used in the fields of mining, petroleum exploration, environmental protection, etc.

The existing methods for preparing light magnesium oxide by using dolomite are mostly dolomite carbonation. According to the dolomite carbonation method, dolomite (Ca magnesium oxide ($CO_3)_2$) is first calcined and decomposed into magnesium oxide and calcium oxide, and then water is added to digest magnesium oxide and calcium oxide to obtain $Mg(OH)_2$ and $Ca(OH)_2$, and then Mg(OH)2 and Ca(OH)2 are carbonated with carbon dioxide to obtain magnesium bicarbonate and calcium carbonate; after removing the calcium carbonate, the mother liquor is pyrolyzed to obtain basic magnesium carbonate, the basic magnesium carbonate is then calcined at 850° C.-900° C. to obtain light magnesium oxide. This method has long process flow, huge equipment, long dehydration time, high energy consumption, small production capacity, difficult process operation control, and low utilization value of the by-product calcium carbonate. If the by-product calcium carbonate is calcined to prepare light calcium oxide, a lot of energy will be consumed, which is not economically reasonable.

With the development and innovation of China's industrial technology and the enhancement of people's awareness of environmental protection, more and more attention has been paid to the effective development and utilization of mineral resources. The market demand for high-quality magnesium compounds will increase year by year; however, the distribution area of magnesite and brine resources in China is limited, but dolomite is widely distributed and its reserves are rich. The comprehensive utilization of dolomite has important practical significance for the development of magnesium resources in China. While using magnesium resources in dolomite, how to effectively use calcium resources in dolomite is an important research direction for comprehensive utilization of dolomite.

BRIEF SUMMARY OF THE INVENTION

The present invention overcomes the shortcomings of the complicated process, high energy consumption and low economic value of by-products in the process of separating calcium and magnesium in the preparation process of light magnesium oxide by the decomposition of dolomite in the prior art, and provides a method for preparing light magnesium oxide and calcium oxide by using dolomite with simple process, low energy consumption and high product economic value. And on the basis of this method, a calcium-magnesium composite expanding agent is further prepared.

In the method for preparing light magnesium oxide and calcium oxide by decomposition of dolomite in the present invention, based on the difference in decomposition temperature between magnesium carbonate and calcium carbonate during the calcination and decomposition of dolomite and the difference in the weight of the materials after decomposition, the effective separation of magnesium oxide and calcium oxide can be realized in a suspension reaction tower by a one-step method according to the principle of negative pressure air separation, thus separately preparing light magnesium oxide and light calcium oxide. It simplifies the technological process, significantly reduces production energy consumption, saves production costs, improves the market competitiveness of light magnesium oxide and light calcium oxide, and expands the direction for the comprehensive application of dolomite.

The suspension reaction tower of the present invention is composed of two layers of calcination belts (i.e., upper and lower calcination belts), which are separated by an air-flow separator.

The airflow separator of the suspension reaction tower in the present invention refers to a specific gravity air separation device which is placed inside the suspension reaction tower and comprises a cyclone system, a frequency conversion system, and a separation wheel.

The principle of the present invention is as follows: the calcination and decomposition process of dolomite is divided into two stages, $$CaMg(CO_3)_2 \xrightarrow{500° C.-550° C.} MgO + CaCO_3 + CO_2 \uparrow \text{ and } CaCO_3 \xrightarrow{850° C.-900° C.} CaO + CO_2 \uparrow.$$

In the present invention, based on the difference in decomposition temperature and decomposition product mass during the calcination and decomposition of dolomite, and a two-layer calcination reaction zone is provided in the suspension reaction tower. The calcination temperature of the upper layer of the suspension reaction tower is controlled at 550° C. to 650° C. so that dolomite can be calcined and decomposed into magnesium oxide, calcium carbonate and carbon dioxide. Since the molecular weight of calcium carbonate is 2.5 times that of magnesium oxide, the effective separation of magnesium oxide and calcium carbonate can be achieved by the specific gravity air separation device. The separated magnesium oxide is collected to obtain light magnesium oxide, one of the desired products of the present invention. The undecomposed calcium carbonate is further decomposed into calcium oxide and carbon dioxide within the calcination temperature of 900° C.-1000° C. in the lower layer of the suspension reaction tower; after the resulting product is collected, light calcium oxide, one of the products required by the present invention, is obtained.

The method for preparing light magnesium oxide and calcium oxide by decomposition of dolomite according to the present invention adopts the following process steps:

(1) Preparation of magnesium oxide: dolomite powder is first ground into a raw dolomite powder with a fineness of about 80 um and a screen residue of 5%, the raw dolomite powder is put into a suspension reaction tower, the calcination temperature of the upper layer of the suspension reaction tower is controlled at about 550° C.-650° C., and the raw dolomite powder absorbs heat during the descent and is decomposed to generate magnesium oxide, carbon dioxide and calcium carbonate. Due to the difference in the weight of the materials, the magnesium oxide and carbon dioxide produced by the decomposition are processed together by an airflow separator of the suspension reaction tower under the action of cyclone negative pressure and discharged from a primary outlet of the suspension reaction tower; after gas-solid separation treatment in a magnesium oxide dust collector, the resulting product is collected to obtain light magnesium oxide, one of the desired products.

(2) Preparation of calcium oxide: the undecomposed calcium carbonate in step (1) further sinks in the suspension reaction tower due to the gravity, and the calcination temperature of the lower layer of the suspension reaction tower is controlled at about 900° C.-1000° C. The undecomposed calcium carbonate absorbs heat during the descent and is decomposed into calcium oxide and carbon dioxide. The calcium oxide and carbon dioxide produced by the decomposition are discharged from a secondary outlet of the suspension reaction tower under the action of cyclone negative pressure, and then undergo gas-solid separation treatment in a calcium oxide dust collector. The resulting product is collected to obtain light calcium oxide, one of the desired products.

In most of the existing methods for preparing magnesium oxide and calcium oxide from dolomite, the dolomite is first calcinated and decomposed into a mixture of magnesium oxide and calcium oxide, and then water is added to digest the mixture to obtain $Mg(OH)_2$ and $Ca(OH)_2$ to realize the separation of magnesium element and calcium element, and finally $Mg(OH)_2$ and $Ca(OH)_2$ are heated and calcinated to prepare magnesium oxide and calcium oxide products separately. Compared with the prior art, based on the difference in decomposition temperature between magnesium carbonate and calcium carbonate during the calcination and decomposition of dolomite and the difference in the weight of the materials after decomposition, the present invention realizes the effective separation of magnesium oxide and calcium oxide in a suspension reaction tower by a one-step method according to the principle of negative pressure air separation, thus separately preparing light magnesium oxide and light calcium oxide. It simplifies the technological process, significantly reduces production energy consumption, saves production costs, improves the market competitiveness of light magnesium oxide and light calcium oxide, and expands the direction for the comprehensive application of dolomite.

As an application of the aforementioned method of separately preparing light magnesium oxide and calcium oxide by decomposition of dolomite, the method is used to prepare a calcium-magnesium composite expanding agent.

The calcium-magnesium composite expanding agent is composed of a calcium expanding component and a magnesium expanding component, wherein the calcium expanding component is calcium oxide expanding clinker, the magnesium expanding component is light magnesium oxide, and the mass ratio of the calcium expanding component to the magnesium expanding component is 1:1.

The calcium expanding component is carbonated calcium oxide expanding clinker, which is prepared by carbonating in a carbonization reactor the activated calcium oxide generated by calcination and decomposition of dolomite.

The magnesium expanding component is light magnesium oxide, which is prepared by calcination and decomposition of dolomite.

The preparation method of the calcium-magnesium composite expanding agent, includes using the above-mentioned process to separately prepare light magnesium oxide and calcium oxide by dolomite decomposition, then followed by the carbonation process of calcium oxide to obtain a carbonated calcium expanding component. The carbon dioxide produced in the production process of magnesium oxide is fed into a carbonization reactor to carbonize calcium oxide to obtain the calcium expanding component, and the calcium-magnesium composite expanding agent is prepared by using the calcium expanding component and the aforementioned magnesium expanding component. It optimizes the expansion process of direct calcination of dolomite to produce a calcium-magnesium composite expanding agent, opens up a new way to prepare the calcium-magnesium composite expanding agent, reduces the production cost of calcium-magnesium composite expanding agent, improves the application effect of calcium-magnesium composite expanding agent in practical engineering, and provides market competitiveness for the promotion and application of calcium-magnesium composite expanding agent, thus having significant social and economic benefits.

The preparation method of the calcium-magnesium composite expanding agent specifically adopts the following technological steps:

(1) Preparation of magnesium expanding component: in the process of separately preparing light magnesium oxide and calcium oxide by the decomposition of dolomite, magnesium oxide and carbon dioxide undergo gas-solid separation in a magnesium oxide dust collector, and after dust removal and purification by the dust collector, hot flue gas with the carbon dioxide content of about 8-12% (volume fraction) is introduced into a carbonization reactor for later use; the sinking light calcined magnesium oxide is discharged from a discharge valve at the lower end of the magnesium oxide dust collector to obtain light calcined magnesium oxide, the desired magnesium expanding component.

(2) Preparation of activated calcium oxide: the activated calcium oxide is prepared by the foregoing step of obtaining calcium oxide in the process of separately preparing light magnesium oxide and calcium oxide by dolomite decomposition.

(3) Carbonation modification: the hot flue gas introduced into the carbonization reactor is pressurized and concentrated into a reaction gas with a reaction pressure of 0.5 MPa and a carbon dioxide concentration of 24%-26% (volume fraction), and then the activated calcium oxide in step (2) is fed into the carbonization reactor by a screw feeder for carbonation reaction, and the reaction in the carbonization reactor is carried out at 180° C.-250° C. for 20 min-40 min to obtain calcium oxide expanding clinker prepared by modification carbonation of the calcium expanding component required by the present invention.

(4) Compounding combination: the magnesium expanding component prepared in step (1) and the calcium expanding component prepared in step (3) are added in a mixer at a mass ratio of 1:1 and stirred for 2 min so that they are mixed thoroughly to obtain the product of the present invention, i.e., a novel calcium-magnesium composite expanding agent.

The reaction of calcium oxide and carbon dioxide to form calcium carbonate is a well-known technology. Chinese Patent No. CN104671688A (Modified Calcium Oxide Expanding Clinker as well as Preparation Method and Application Thereof) and Chinese Patent No. CN102459116A (Expansive Admixture and Method for Producing Same) both disclose the use of a carbonation reaction between calcium oxide and carbon dioxide to delay the hydration rate of calcium oxide clinker, where carbonation is either carried out at a high temperature of 200° C.-800° C. or carried out at a low temperature of less than 200° C. under the catalytic action of steam. To sum up, these technical routes perform carbonation under normal pressure. According to the characteristics of the production device, the present invention utilizes the carbon dioxide produced during the calcination and decomposition process of dolomite in the suspension reaction tower; after being filtered and dedusted, the carbon dioxide enters the carbonization reactor and is pressurized and concentrated to carry out carbonation reaction with activated calcium oxide; preferably, the carbonation reaction is carried out at 180° C.-250° C. under the pressure of 0.5 MPa, and the reaction concentration of carbon dioxide is 24%-26% (volume fraction).

Compared with the existing products, the present invention uses dolomite with abundant reserves as raw materials to separately prepare light magnesium oxide (magnesium expanding component) and carbonated calcium oxide expanding clinker (calcium expanding component) in the calcium-magnesium composite expanding agent through a suspension reaction tower and a carbonization reactor. Under the premise of ensuring the reactivity of the light magnesium oxide (the magnesium expanding component), calcium carbonate produced by carbonation modification is used to wrap the free calcium oxide (the calcium expanding component), thereby reducing the reactivity of the calcium expanding component and regulating the expansion rate of the calcium expanding component. On the one hand, the present invention solves the problem of the limited origin of the light magnesium oxide raw material of the magnesium expanding component in the calcium-magnesium composite expanding agent. On the other hand, the present invention solves the problem that the calcium expanding component free calcium oxide in the calcium-magnesium composite expanding agent has very high hydration reaction rate and low effective expansion efficiency. It optimizes the expansion process of direct calcination of dolomite to produce a calcium-magnesium composite expanding agent, opens up a new way to prepare the calcium-magnesium composite expanding agent, reduces the production cost of calcium-magnesium composite expanding agent, improves the application effect of calcium-magnesium composite expanding agent in practical engineering, and provides market competitiveness for the promotion and application of calcium-magnesium composite expanding agent, thus having significant social and economic benefits.

DETAILED DESCRIPTION OF THE INVENTION

In order to better understand the present invention, the contents of the present invention will be further detailed below with reference to embodiments, but the contents of the present invention are not limited to the following embodiments. The anhydrite dolomite used in the examples of the present invention is sourced from the Anhui dolomite mining area and mainly comprises the following components in percentage by weight: 21.10% of magnesium oxide, 30.28% of calcium oxide, 0.92% of $SiO_2$, 0.37% of Fe2O3, and 0.39% of $Al_2O_3$, with a loss on ignition of 46.51%.

(I) Preparation of Light Magnesium Oxide and Calcium Oxide by Decomposition of Dolomite Example 1

A method for separately preparing light magnesium oxide and calcium oxide by decomposition of dolomite according to the present invention comprises the following two steps:

(1) Preparation of magnesium oxide: dolomite powder was first ground into a raw dolomite powder with a fineness of about 80 um and a screen residue of 4%, the raw dolomite powder was put into the suspension reaction tower, the calcination temperature of the upper layer of the suspension reaction tower was controlled at 550° C., and the raw dolomite powder absorbed heat during the descent and was decomposed to generate magnesium oxide, carbon dioxide and calcium carbonate. Due to the difference in the weight of the materials, the magnesium oxide and carbon dioxide produced by the decomposition were processed together by an airflow separator of the suspension reaction tower under the action of cyclone negative pressure and discharged from a primary outlet of the suspension reaction tower; after gas-solid separation treatment in a magnesium oxide dust collector, the resulting product was collected to obtain light magnesium oxide, one of the products of the present invention. The chemical composition of the light magnesium oxide prepared by the present invention was tested according to the method specified in the current ferrous metallurgical industry standard YB/T 5206-2004 "Light Calcined Magnesium Oxide". The results are shown in Table 1. It can be seen from the data in Table 1 that the light magnesium oxide prepared by the present invention meets the requirements of CBM85.

TABLE 1

| No. | MgO | $SiO_2$ | CaO | $Fe_2O_3$ | Loss on ignition |
|---|---|---|---|---|---|
| Example 1 | 85.66% | 2.23% | 3.61% | 0.92% | 7.15% |
| Values required by indicators in YB/T5206-2004 CBM85 | ≥85.0% | ≤6.0% | ≤4.0% | — | ≤8.0% |

(2) Preparation of calcium oxide: the undecomposed calcium carbonate in step (1) further sunk in the suspension reaction tower due to the gravity, and the calcination temperature of the lower layer of the suspension reaction tower was controlled at about 900° C. The undecomposed calcium carbonate absorbed heat during the descent and was decomposed into calcium oxide and carbon dioxide. The calcium oxide and carbon dioxide produced by the decomposition were discharged from a secondary outlet of the suspension reaction tower under the action of cyclone negative pressure and then underwent gas-solid separation treatment in a calcium oxide dust collector. The resulting product was collected to obtain light calcium oxide, one of the products of the present invention. The chemical composition of the light calcium oxide prepared by the present invention was tested according to the method specified in the current chemical industry standard HG/T 4205-2011 "Industrial Calcium Oxide". The results are shown in Table 2. It can be seen from the data in Table 2 that the light calcium oxide prepared by the present invention meets the requirements of Class III products of the chemical industry standard "Industrial Calcium Oxide" and can be used in industries such as plastics and rubber manufacturing and flue gas desulfurization.

TABLE 2

| No. | CaO | MgO | $SiO_2$ | Insoluble in HCl solution | Loss on ignition |
|---|---|---|---|---|---|
| Example 1 | 90.55% | 2.37% | 2.69% | 0.22% | 3.50% |
| Values required by Class III indicators in HG/T4205-2011 | ≥90.0% | — | — | ≤0.5% | ≤4.0% |

Example 2

A method for separately preparing light magnesium oxide and calcium oxide by decomposition of dolomite according to the present invention comprises the following two steps:

(1) Preparation of magnesium oxide: dolomite powder was first ground into a raw dolomite powder with a fineness of about 80 um and a screen residue of 5%, the raw dolomite powder was put into the suspension reaction tower, the calcination temperature of the upper layer of the suspension reaction tower was controlled at 600° C., and the raw dolomite powder absorbed heat during the descent and was decomposed to generate magnesium oxide, carbon dioxide and calcium carbonate. Due to the difference in the weight of the materials, the magnesium oxide and carbon dioxide produced by the decomposition were processed together by an airflow separator of the suspension reaction tower under the action of cyclone negative pressure and discharged from a primary outlet of the suspension reaction tower; after gas-solid separation treatment in a magnesium oxide dust collector, the resulting product was collected to obtain light magnesium oxide, one of the products of the present invention. The chemical composition of the light magnesium oxide prepared by the present invention was tested according to the method specified in the current ferrous metallurgical industry standard YB/T 5206-2004 "Light Calcined Magnesium Oxide". The results are shown in Table 3. It can be seen from the data in Table 3 that the light magnesium oxide prepared by the present invention meets the requirements of CBM85.

TABLE 3

| No. | MgO | $SiO_2$ | CaO | $Fe_2O_3$ | Loss on ignition |
|---|---|---|---|---|---|
| Example 2 | 85.92% | 3.11% | 3.07% | 0.89% | 6.62% |
| Values required by indicators in YB/T5206-2004 CBM85 | ≥85.0% | ≤6.0% | ≤4.0% | — | ≤8.0% |

(2) Preparation of calcium oxide: the undecomposed calcium carbonate in step (1) further sunk in the suspension reaction tower due to the gravity, and the calcination temperature of the lower layer of the suspension reaction tower was controlled at about 950° C. The undecomposed calcium carbonate absorbed heat during the descent and was decomposed into calcium oxide and carbon dioxide. The calcium oxide and carbon dioxide produced by the decomposition were discharged from a secondary outlet of the suspension reaction tower under the action of cyclone negative pressure and then underwent gas-solid separation treatment in a calcium oxide dust collector. The resulting product was collected to obtain light calcium oxide, one of the products of the present invention. The chemical composition of the light calcium oxide prepared by the present invention was tested according to the method specified in the current chemical industry standard HG/T 4205-2011 "Industrial Calcium Oxide". The results are shown in Table 4. It can be seen from the data in Table 4 that the light calcium oxide prepared by the present invention meets the requirements of Class III products of the chemical industry standard "Industrial Calcium Oxide" and can be used in industries such as plastics and rubber manufacturing and flue gas desulfurization.

TABLE 4

| No. | CaO | MgO | $SiO_2$ | Insoluble in HCl solution | Loss on ignition |
|---|---|---|---|---|---|
| Example 2 | 90.69% | 2.03% | 2.37% | 0.28% | 3.22% |
| Values required by Class III indicators in HG/T4205-2011 | ≥90.0% | — | — | ≤0.5% | ≤4.0% |

Example 3

A method for separately preparing light magnesium oxide and calcium oxide by decomposition of dolomite according to the present invention comprises the following two steps:

(1) Preparation of magnesium oxide: dolomite powder was first ground into a raw dolomite powder with a fineness of about 80 um and a screen residue of 6%, the raw dolomite powder was put into the suspension reaction tower, the calcination temperature of the upper layer of the suspension reaction tower was controlled at 650° C., and the raw dolomite powder absorbed heat during the descent and was decomposed to generate magnesium oxide, carbon dioxide and calcium carbonate. Due to the difference in the weight of the materials, the magnesium oxide and carbon dioxide produced by the decomposition were processed together by an airflow separator of the suspension reaction tower under the action of cyclone negative pressure and discharged from a primary outlet of the suspension reaction tower; after gas-solid separation treatment in a magnesium oxide dust collector, the resulting product was collected to obtain light magnesium oxide, one of the products of the present invention. The chemical composition of the light magnesium oxide prepared by the present invention was tested according to the method specified in the current ferrous metallurgical industry standard YB/T 5206-2004 "Light Calcined Magnesium Oxide". The results are shown in Table 5. It can be seen from the data in Table 5 that the light magnesium oxide prepared by the present invention meets the requirements of CBM85.

TABLE 5

| No. | MgO | $SiO_2$ | CaO | $Fe_2O_3$ | Loss on ignition |
|---|---|---|---|---|---|
| Example 3 | 86.13% | 3.38% | 2.81% | 0.93% | 6.08% |
| Values required by indicators in YB/T5206-2004 CBM85 | ≥85.0% | ≤6.0% | ≤4.0% | — | ≤8.0% |

(2) Preparation of calcium oxide: the undecomposed calcium carbonate in step (1) further sunk in the suspension reaction tower due to the gravity, and the calcination temperature of the lower layer of the suspension reaction tower was controlled at about 1000° C. The undecomposed calcium carbonate absorbed heat during the descent and was decomposed into calcium oxide and carbon dioxide. The calcium oxide and carbon dioxide produced by the decomposition were discharged from a secondary outlet of the suspension reaction tower under the action of cyclone negative pressure and then underwent gas-solid separation treatment in a calcium oxide dust collector. The resulting product was collected to obtain light calcium oxide, one of the products of the present invention. The chemical composition of the light calcium oxide prepared by the present invention was tested according to the method specified in the current chemical industry standard HG/T 4205-2011 "Industrial Calcium Oxide". The results are shown in Table 6. It can be seen from the data in Table 6 that the light calcium oxide prepared by the present invention meets the requirements of Class III products of the chemical industry standard "Industrial Calcium Oxide" and can be used in industries such as plastics and rubber manufacturing and flue gas desulfurization.

TABLE 6

| No. | CaO | MgO | $SiO_2$ | Insoluble in HCl solution | Loss on ignition |
|---|---|---|---|---|---|
| Example 3 | 90.95% | 1.88% | 2.92% | 0.33% | 3.01% |
| Values required by Class III indicators in HG/T4205-2011 | ≥90.0% | — | — | ≤0.5% | ≤4.0% |

(II) Calcium-Magnesium Composite Expanding Agent

Application Example 1

A preparation method of a calcium-magnesium composite expanding agent is disclosed and its production process is implemented by the following steps:

(1) Preparation of magnesium expanding component: dolomite powder was first ground into a raw dolomite powder with a fineness of about 80 um and a screen residue of 5%, the raw dolomite powder was put into the suspension reaction tower, the calcination temperature of the upper layer of the suspension reaction tower was controlled at 600° C., and the raw dolomite powder absorbed heat during the descent and was decomposed to generate magnesium oxide, carbon dioxide and calcium carbonate. Due to the difference in the weight of the materials, the magnesium oxide and carbon dioxide produced by the decomposition were processed together by an airflow separator of the suspension tower under the action of cyclone negative pressure and discharged from a primary outlet of the suspension tower and entered a magnesium oxide dust collector. Magnesium oxide and carbon dioxide underwent gas-solid separation in the magnesium oxide dust collector, and after dust removal and purification by the dust collector, hot flue gas with the carbon dioxide content of about 12% (volume fraction) was introduced into a carbonization reactor for later use; the sinking magnesium oxide was discharged from a discharge valve at the lower end of the magnesium oxide dust collector to obtain light magnesium oxide, the desired magnesium expanding component.

(2) Preparation of calcium oxide: the undecomposed calcium carbonate in step (1) further sunk in the suspension tower due to the gravity, and the calcination temperature of the lower layer of the suspension reaction tower was controlled at about 1050° C. The undecomposed calcium carbonate absorbed heat during the descent and was decomposed into activated calcium oxide and carbon dioxide. The activated calcium oxide and carbon dioxide produced by the decomposition were discharged from a secondary outlet of the suspension tower under the action of cyclone negative pressure and entered a calcium oxide dust collector. Calcium oxide and carbon dioxide underwent gas-solid separation in the calcium oxide dust collector, and after dust removal and purification by the dust collector, hot flue gas with the carbon dioxide content of about 12% (volume fraction) was introduced into a carbonization reactor for later use; the sinking calcium oxide was discharged from a discharge valve at the lower end of the calcium oxide dust collector to obtain activated calcium oxide.

(3) Carbonation modification: the hot flue gas introduced into the carbonization reactor was pressurized and concentrated into a reaction gas with a reaction pressure of 0.5 MPa and a carbon dioxide concentration of 25% (volume fraction), and then the activated calcium oxide in step (2) is fed into the carbonization reactor by a screw feeder for carbonation reaction, and the reaction in the carbonization reactor is carried out at 220° C. for 30 min to obtain calcium oxide expanding clinker prepared by modification carbonation of the calcium expanding component required by the present invention.

(4) Compounding combination: the magnesium expanding component prepared in step (1) and the calcium expanding component prepared in step (3) were added in a mixer at a mass ratio of 1:1 and stirred for 2 min so that they were mixed thoroughly to obtain the product of the present invention, i.e., a novel calcium-magnesium composite expanding agent.

Application Example 2

A preparation method of a calcium-magnesium composite expanding agent is disclosed and its production process is implemented by the following steps:

(1) Preparation of magnesium expanding component: dolomite powder was first ground into a raw dolomite powder with a fineness of about 80 um and a screen residue of 5%, the raw dolomite powder was put into the suspension reaction tower, the calcination temperature of the upper layer of the suspension reaction tower was controlled at 550° C., and the raw dolomite powder absorbed heat during the descent and was decomposed to generate magnesium oxide, carbon dioxide and calcium carbonate. Due to the difference in the weight of the materials, the magnesium oxide and carbon dioxide produced by the decomposition were processed together by an airflow separator of the suspension tower under the action of cyclone negative pressure and discharged from a primary outlet of the suspension tower and entered a magnesium oxide dust collector. Magnesium oxide and carbon dioxide underwent gas-solid separation in the magnesium oxide dust collector, and after dust removal and purification by the dust collector, hot flue gas with the carbon dioxide content of about 8% (volume fraction) was introduced into a carbonization reactor for later use; the sinking magnesium oxide was discharged from a discharge valve at the lower end of the magnesium oxide dust collector to obtain light magnesium oxide, the desired magnesium expanding component.

(2) Preparation of calcium oxide: the undecomposed calcium carbonate in step (1) further sunk in the suspension tower due to the gravity, and the calcination temperature of the lower layer of the suspension reaction tower was controlled at about 950° C. The undecomposed calcium carbonate absorbed heat during the descent and was decomposed into activated calcium oxide and carbon dioxide. The activated calcium oxide and carbon dioxide produced by the decomposition were discharged from a secondary outlet of the suspension tower under the action of cyclone negative pressure and entered a calcium oxide dust collector. Calcium oxide and carbon dioxide underwent gas-solid separation in the calcium oxide dust collector, and after dust removal and purification by the dust collector, hot flue gas with the carbon dioxide content of about 8% (volume fraction) was introduced into a carbonization reactor for later use; the sinking calcium oxide was discharged from a discharge valve at the lower end of the calcium oxide dust collector to obtain activated calcium oxide.

(3) Carbonation modification: the hot flue gas introduced into the carbonization reactor was pressurized and concentrated into a reaction gas with a reaction pressure of 0.5 MPa and a carbon dioxide concentration of 25% (volume fraction), and then the activated calcium oxide in step (2) is fed into the carbonization reactor by a screw feeder for carbonation reaction, and the reaction in the carbonization reactor is carried out at 180° C. for 40 min to obtain calcium oxide expanding clinker prepared by modification carbonation of the calcium expanding component required by the present invention.

(4) Compounding combination: the magnesium expanding component prepared in step (1) and the calcium expanding component prepared in step (3) were added in a mixer at a mass ratio of 1:1 and stirred for 2 min so that they were mixed thoroughly to obtain the product of the present invention, i.e., a novel calcium-magnesium composite expanding agent.

Application Example 3

A preparation method of a calcium-magnesium composite expanding agent is disclosed and its production process is implemented by the following steps:

(1) Preparation of magnesium expanding component: dolomite powder was first ground into a raw dolomite powder with a fineness of about 80 um and a screen residue of 5%, the raw dolomite powder was put into the suspension reaction tower, the calcination temperature of the upper layer of the suspension reaction tower was controlled at 650° C., and the raw dolomite powder absorbed heat during the descent and was decomposed to generate magnesium oxide, carbon dioxide and calcium carbonate. Due to the difference in the weight of the materials, the magnesium oxide and carbon dioxide produced by the decomposition were processed together by an airflow separator of the suspension tower under the action of cyclone negative pressure and discharged from a primary outlet of the suspension tower and entered a magnesium oxide dust collector. Magnesium oxide and carbon dioxide underwent gas-solid separation in the magnesium oxide dust collector, and after dust removal and purification by the dust collector, hot flue gas with the carbon dioxide content of about 10% (volume fraction) was introduced into a carbonization reactor for later use; the sinking magnesium oxide was discharged from a discharge valve at the lower end of the magnesium oxide dust collector to obtain light magnesium oxide, the desired magnesium expanding component.

(2) Preparation of calcium oxide: the undecomposed calcium carbonate in step (1) further sunk in the suspension tower due to the gravity, and the calcination temperature of the lower layer of the suspension reaction tower was controlled at about 1100° C. The undecomposed calcium carbonate absorbed heat during the descent and was decomposed into activated calcium oxide and carbon dioxide. The activated calcium oxide and carbon dioxide produced by the decomposition were discharged from a secondary outlet of the suspension tower under the action of cyclone negative pressure and entered a calcium oxide dust collector. Calcium oxide and carbon dioxide underwent gas-solid separation in the calcium oxide dust collector, and after dust removal and purification by the dust collector, hot flue gas with the carbon dioxide content of about 10% (volume fraction) was introduced into a carbonization reactor for later use; the sinking calcium oxide was discharged from a discharge valve at the lower end of the calcium oxide dust collector to obtain activated calcium oxide.

(3) Carbonation modification: the hot flue gas introduced into the carbonization reactor was pressurized and concentrated into a reaction gas with a reaction pressure of 0.5 MPa and a carbon dioxide concentration of 25% (volume fraction), and then the activated calcium oxide in step (2) is fed into the carbonization reactor by a screw feeder for carbonation reaction, and the reaction in the carbonization reactor is carried out at 220° C. for 20 min to obtain calcium oxide expanding clinker prepared by modification carbonation of the calcium expanding component required by the present invention.

(4) Compounding combination: the magnesium expanding component prepared in step (1) and the calcium expanding component prepared in step (3) were added in a mixer at a mass ratio of 1:1 and stirred for 2 min so that they were mixed thoroughly to obtain the product of the present invention, i.e., a novel calcium-magnesium composite expanding agent.

Comparative Application Example 1

The dolomite raw material used in this comparative application example was the same as that in application examples 1 to 3. According to the existing well-known technology, the dolomite powder was first ground into a raw dolomite powder with a fineness of 80 um and a screen residue of 6%, and then the raw dolomite powder was calcined at 1100° C. for 90 min to prepare a calcium-magnesium composite expanding agent composed of a mixture of magnesium oxide and calcium oxide.

Existing standards evaluate the shrinkage compensation performance of expanding agents for concrete under the constant-temperature standard curing conditions, but in actual concrete structures, the cement hydration and heat release or changes in the external environment make the concrete temperature change with time. In order to evaluate the application effect of the present invention in actual engineering, the actual temperature change history of a certain section of structural concrete during 90 days of age was taken as the test temperature curve, and the examples of the present invention and the comparative examples under a variable temperature curing environment were compared and evaluated in terms of the shrinkage compensation effect.

TABLE 7

Mix ratio of test concrete

| No. | PO42.5 cement | Expanding agent | Stone | Sand | Water | Water reducer |
|---|---|---|---|---|---|---|
| Blank | 360 | 0 | 1080 | 760 | 160 | 1.9 |
| Application Example 1 | 334.8 | 25.2 | 1080 | 760 | 160 | 1.9 |
| Application Example 2 | 334.8 | 25.2 | 1080 | 760 | 160 | 1.9 |
| Application Example 3 | 334.8 | 25.2 | 1080 | 760 | 160 | 1.9 |
| Comparative Application Example 1 | 334.8 | 25.2 | 1080 | 760 | 160 | 1.9 |

Figure 1:
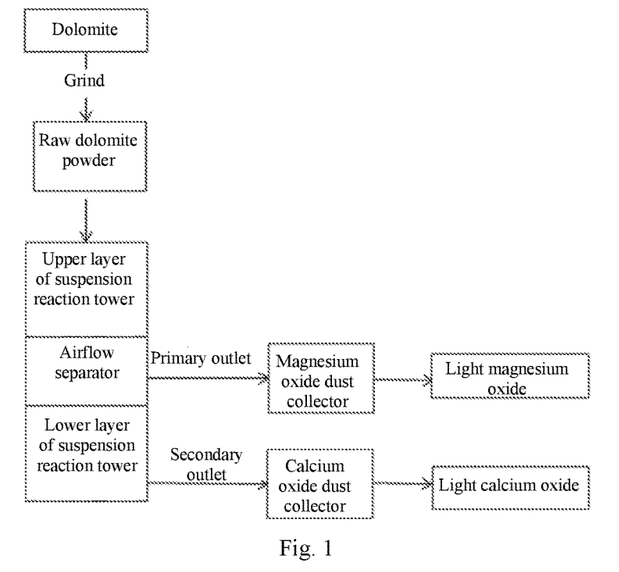
FIG. 1 shows a flow chart of the preparation process of using dolomite to separately prepare light magnesium oxide and calcium oxide.
Figure 2:
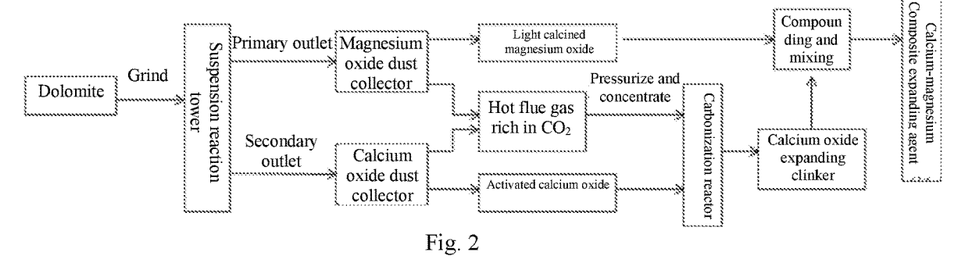
FIG. 2 shows a flow chart of the preparation process of a calcium-magnesium composite expanding agent.
Figure 3:
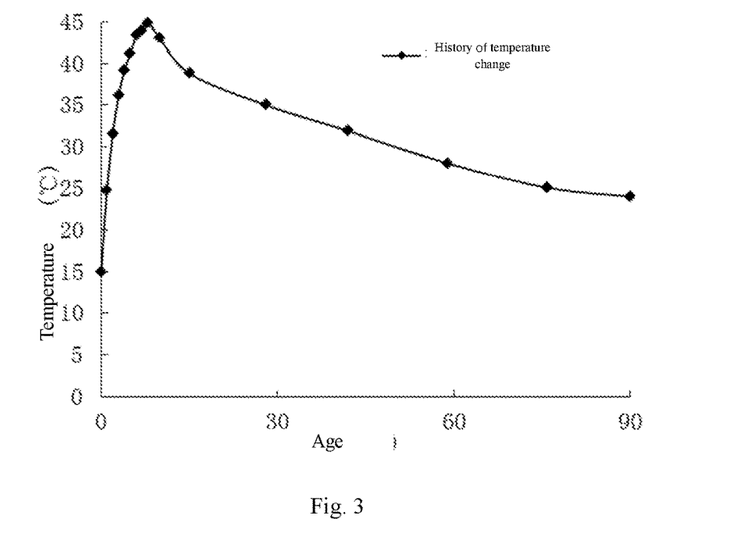
FIG. 3 shows a test temperature variation curve simulating the temperature variation of super-long and super-thick structural concrete.
Figure 4:
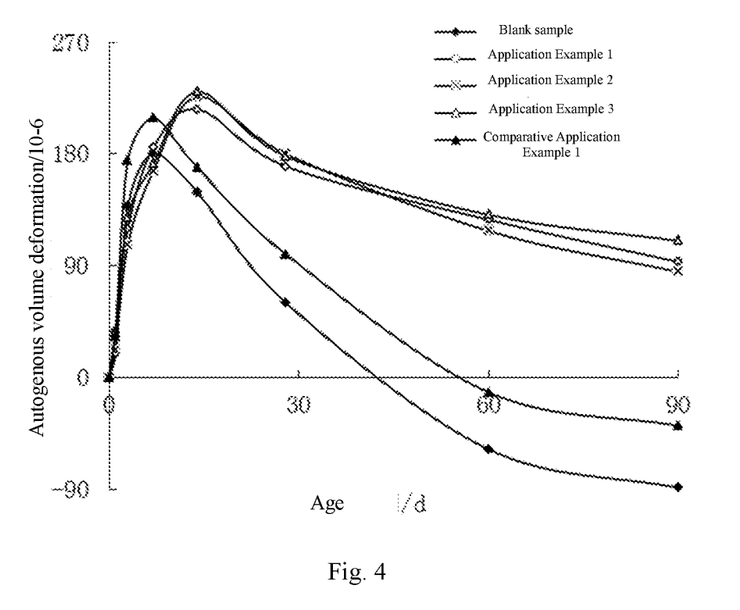
FIG. 4 shows the autogenous volume deformation curve of a blank sample of a reference concrete without an expanding agent, a concrete mixed with 7% of Application example 1 of the invention, a concrete mixed with 7% of Application example 2 of the invention, a concrete mixed with 7% of Application example 3 of the invention and a concrete mixed with 7% of Comparative example 1 under the variable temperature curing condition.

Using the application examples and the comparative application example obtained by the present invention underwent concrete detection tests with blank samples without expanding agents. According to the mix ratio of concrete shown in Table 7, in a mixer, the application examples of the present invention, the comparative examples and other raw materials constituting the concrete were mixed together into the desired concrete mixture; the slump of the concrete out of the machine was controlled to be 140 mm-160 mm and the desired concrete mixture was cast into a $\varphi 150\times 500$ mm concrete cylinder, a strain gauge was embedded in the test piece, and the test piece was then sealed and maintained in an environmental test box. The test temperature change curve in the environmental test box is shown in FIG. 3. Taking the final setting time of concrete as the starting time for the measurement, the test results of the autogenous volume deformation of the concrete samples during variable temperature curing are shown in FIG. 4.

The results show that the concretes mixed with and without the expanding agent both produce obvious autogenous volume expansion deformation with the increase of temperature during the temperature rise stage. Among them, the concrete mixed with Application Example 1, Application Example 2 and Application Example 3 of the present invention has relatively small autogenous volume expansion deformation during the temperature rise stage; however, the autogenous volume expansion deformation of the concrete mixed with Comparative Application Example 1 during the temperature rise phase is relatively large. In the cooling stage, the autogenous volume deformation of both the reference concrete blank sample without an expanding agent and the concrete mixed with Comparative Application Example 1 shows shrinkage deformation as the temperature decreases; however, the autogenous volume deformation of the concrete mixed with the application examples of the present invention still shows a certain continuous expansion deformation at the initial stage of the maintenance temperature decrease. It can be seen that, compared with Comparative Application Example 1, the application examples of the present invention have continuous expansion performance in concrete, especially show obvious expansion in the temperature drop stage, and have better compensation effect on temperature shrinkage of super-long and super-thick structural concrete.

What is claimed is:
1. A method for preparing light magnesium oxide and calcium oxide, comprising
preparing light magnesium oxide and calcium oxide based on
a difference in decomposition temperature between magnesium carbonate and calcium carbonate during calcination and decomposition of dolomite;
and a difference in weight of materials after decomposition,
separating magnesium oxide and calcium oxide effectively in a suspension reaction tower by a one-step method according to a principle of negative pressure air separation, thus separately preparing light magnesium oxide and light calcium oxide.
2. The method according to claim 1, wherein the suspension reaction tower is composed of two layers of calcination belts, upper and lower calcination belts, which are separated by an airflow separator.
3. The method according to claim 2, wherein an airflow separator of the suspension reaction tower refers to a specific gravity air separation device which is placed inside the suspension reaction tower and comprises a cyclone system, a frequency conversion system, and a separation wheel.

4. The method according to claim 3, wherein a two-layer calcination reaction zone is provided in the suspension reaction tower, the calcination temperature of the upper layer of the suspension reaction tower is controlled at 550° C. to 650° C. so that dolomite is calcined and decomposed into magnesium oxide, calcium carbonate and carbon dioxide; since the molecular weight of calcium carbonate is 2.5 times that of magnesium oxide, an effective separation of magnesium oxide and calcium carbonate is achieved by the specific gravity air separation device; the separated magnesium oxide is collected to obtain light magnesium oxide; undecomposed calcium carbonate is further decomposed into calcium oxide and carbon dioxide within the calcination temperature of 900° C.-1000° C. in the lower layer of the suspension reaction tower; after the resulting product is collected, light calcium oxide is obtained.

5. The method according to claim 4, comprising the following process steps:
(1) preparing magnesium oxide:
   grinding dolomite powder first into a raw dolomite powder with a fineness of about 80 um and a screen residue of 4%-6%,
   transferring the raw dolomite powder into the suspension reaction tower,
   controlling the calcination temperature of the upper layer of the suspension reaction tower at 550° C.-650° C., and the raw dolomite powder absorbs heat during a descent and is decomposed to generate magnesium oxide, carbon dioxide and calcium carbonate; due to a difference in weights of the materials, the magnesium oxide and carbon dioxide produced by the decomposition are processed together by an airflow separator of the suspension reaction tower under the action of cyclone negative pressure and discharged from a primary outlet of the suspension reaction tower; after gas-solid separation treatment in a magnesium oxide dust collector, the resulting product is collected to obtain light magnesium oxide, one of desired products;
(2) preparing calcium oxide:
   allowing undecomposed calcium carbonate in step (1) further to sink in the suspension reaction tower due to its gravity, and
   controlling the calcination temperature of the lower layer of the suspension reaction tower at about 900° C.-1000° C.;
   wherein the undecomposed calcium carbonate absorbs heat during the sinking process and is decomposed into calcium oxide and carbon dioxide;
   discharging the calcium oxide and carbon dioxide produced by the decomposition from a secondary outlet of the suspension reaction tower under the action of cyclone negative pressure, and then undergo gas-solid separation treatment in a calcium oxide dust collector;
   collecting resulting product to obtain light calcium oxide, one of the desired products.

6. A method to prepare a calcium-magnesium composite expanding agent, comprising preparing a light magnesium oxide and calcium oxide according to claim 5.

7. The method according to claim 6, wherein a method for preparing a calcium-magnesium composite expansion agent, comprising separately preparing light magnesium oxide and calcium oxide by dolomite decomposition, then followed by the carbonation process of calcium oxide to obtain a carbonated calcium expanding component; and the calcium-magnesium composite expanding agent is prepared by using the carbonated calcium expanding component and the magnesium expanding component.

8. The method according to claim 7, wherein the carbonation process is to set up a carbonization reactor and use and feed carbon dioxide generated in the production process of magnesium oxide into the carbonization reactor to carbonize calcium oxide.

9. The method according to claim 8, specifically comprising the following steps:
(1) preparing magnesium expanding component:
   In a process of separately preparing light magnesium oxide and calcium oxide by the decomposition of dolomite, magnesium oxide and carbon dioxide undergo gas-solid separation in a magnesium oxide dust collector, and after dust removal and purification by the dust collector, hot flue gas with the carbon dioxide content of 8-12% is introduced into a carbonization reactor for later use; sinking light calcined magnesium oxide is discharged from a discharge valve at lower end of the magnesium oxide dust collector to obtain light magnesium oxide, the desired magnesium expanding component;
(2) preparing activated calcium oxide:
   the activated calcium oxide is prepared by a step of obtaining calcium oxide in the process of separately preparing light magnesium oxide and calcium oxide by dolomite decomposition;
(3) undergoing carbonation modification:
   the hot flue gas introduced into the carbonization reactor is pressurized and concentrated into a reaction gas with a reaction pressure of 0.5 MPa and a carbon dioxide concentration of 24%-26%, and then the activated calcium oxide in step (2) is fed into the carbonization reactor by a screw feeder for carbonation reaction, and the reaction in the carbonization reactor is carried out at 180° C.-250° C. for 20 min-40 min to obtain calcium oxide expanding clinker prepared by modification carbonation of the calcium expanding component required by the present invention; and
   compounding combination: the magnesium expanding component prepared in step (1) and the calcium expanding component prepared in step (3) are added in a mixer at a mass ratio of 1:1 and stirred for 2 min so that they are mixed thoroughly to obtain a calcium-magnesium composite expanding agent.

\* \* \* \* \*